United States Patent [19]

Yamamoto et al.

[11] Patent Number: 4,776,819

[45] Date of Patent: Oct. 11, 1988

[54] ELECTRICAL CONTROL FOR TRIM/TILT OF DUAL MARINE PROPULSION DEVICE

[75] Inventors: Yasuo Yamamoto; Takashi Koike, both of Hamamatsu, Japan

[73] Assignee: Sanshin Kogyo Kabushiki Kaisha, Hamamatsu, Japan

[21] Appl. No.: 799,937

[22] Filed: Nov. 20, 1985

[30] Foreign Application Priority Data

Nov. 21, 1984 [JP] Japan .............................. 59-244398

[51] Int. Cl.[4] .............................................. B63H 5/08

[52] U.S. Cl. ......................................... 440/61; 440/79

[58] Field of Search ....................... 440/53, 61, 1, 2, 8, 440/79, 112, 62, 900

[56] References Cited

U.S. PATENT DOCUMENTS 2,999,476 9/1961 Johnson ............................... 440/79
3,434,449 3/1969 North .................................. 440/61
3,752,111 8/1973 Meynier, Jr. ........................ 440/112
4,310,320 1/1982 Pitchford ........................... 440/61

*Primary Examiner*—Sherman D. Basinger
*Assistant Examiner*—Jesûs D. Sotelo
*Attorney, Agent, or Firm*—Ernest A. Beutler

[57] ABSTRACT

Several embodiments of remote control operators for adjusting the trim of a pair of marine propulsion devices. Each control system is designed so as to permit selective trim adjustment of either of the propulsion devices independently of the other and regardless of its trim adjusted position or for permitting simultaneous adjustment of both of said propulsion devices. A number of different types of circuits are illustrated for accomplishing this result and the adjusted propulsion devices may comprise either an outboard motor, the outboard drive of an inboard/outboard drive or the screws of a twin screw inboard drive.

52 Claims, 6 Drawing Sheets

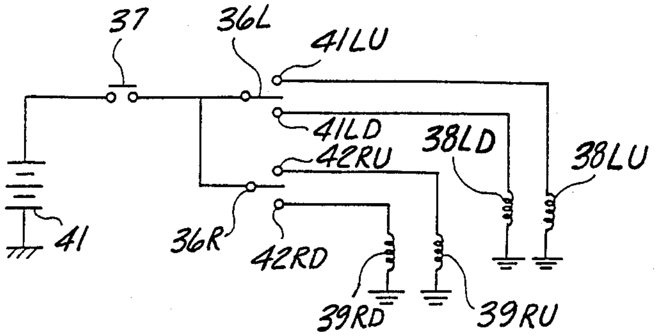
Fig-4
Fig-5
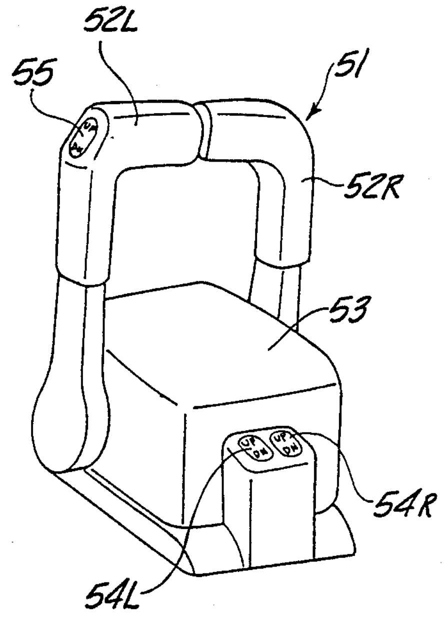
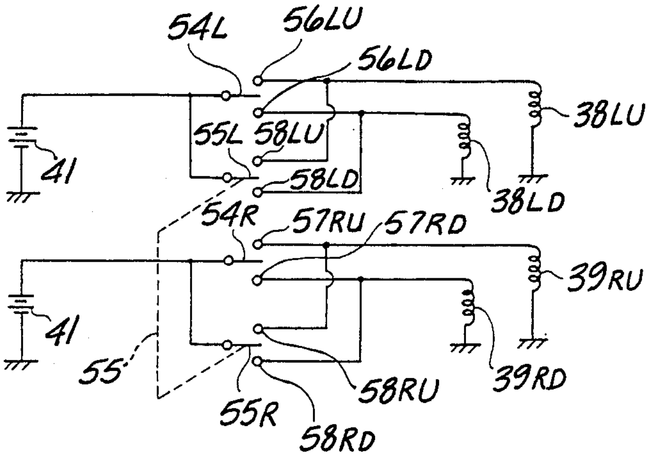
Fig-6

ELECTRICAL CONTROL FOR TRIM/TILT OF DUAL MARINE PROPULSION DEVICE

BACKGROUND OF THE INVENTION

This invention relates to an electrical control for the tilt and trim of dual marine propulsion devices and more particularly to an improved control for dual marine propulsion units that permits independent and/or simultaneous adjustment of the propulsion devices regardless of their position.

In many marine applications, there is an advantage in providing plural propulsion means. These plural propulsion means may comprise twin screws for an inboard drive, dual outboard motors for an outboard drive condition or dual stern units for an inboard/outboard drive. With each of these types of marine propulsion units, it is desirable to provide an arrangement for adjusting at least the trim position of the propulsion unit relative to the associated watercraft. With outboard motors or inboard/outboard drives, it is also desirable to provide an arrangement for tilting up the outboard drive from its normal running condition to an out of the water condition. A number of various tilt and trim adjusting mechanism have been proposed for single propulsion units. When the propulsion units are paired, it has been the general practice to employ individual controls for controling the tilt and trim condition of each propulsion unit independently of the others. Although this has the advantage of simplicity, there are a number of situations wherein it is desirable to adjust both of the propulsion units simultaneously. In addition, however, it is also desirable to incorporate an arrangement for permitting individual adjustments of the propulsion units relative to each other.

It is, therefore, a principal object of this invention to provide an improved tilt and trim control for dual marine propulsion devices.

It is a further object of this invention to provide a tilt and trim adjustment for dual marine propulsion devices wherein the devices may be adjusted independently of each other or may be adjusted simultaneously.

It is a yet further object of this invention to provide an improved tilt and trim adjusting device for marine propulsion units that will permit independent or simultaneous adjustment of the trim positions and regardless of their initial condition.

SUMMARY OF THE INVENTION

This invention is adapted to be embodied in a marine drive for controlling a pair of propulsion means each of which is adapted to be mounted relative to an associated watercraft for movement in a trim adjusting direction. First and second drive means are each associated with a respective one of the propulsion means for moving the respective propulsion means relative to the associated watercraft in a trim adjusting direction. First control means are provided for selectively operating the first drive means for adjusting the trim of the first of the propulsion means regardless of the trim adjusted position thereof. Second control means are provided for selectively operating the second drive means for adjusting the trim position of the second of the propulsion means regardless of its trim adjusted position. Third control means are provided for simultaneously operating the first and second drive means to adjust the trim position of both of the propulsion means and independently of the position of either of the propulsion means.

BRIEF DESCRIPTION OF THE DRAWINGS

FIG. 4 is a schematic electrical circuit showing the control device of this embodiment.

FIG. 5 is a perspective view, in part similar to FIG. 2, showing a control device constructed in accordance with another embodiment of the invention.

FIG. 6 is a schematic electrical circuit of the embodiment of FIG. 5.

DETAILED DESCRIPTION OF THE PREFERRED EMBODIMENTS

Embodiment Of FIGS. 1 Through 4

Figure 1:
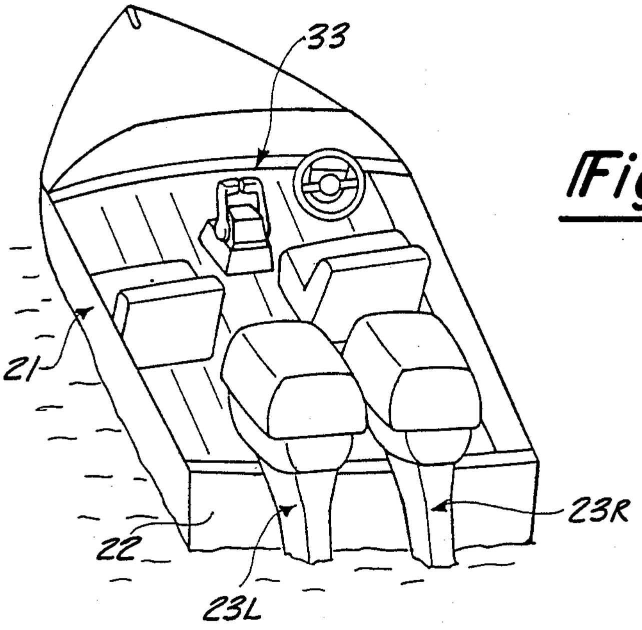
FIG. 1 is a perspective view of a watercraft having a dual propulsion unit incorporating a tilt and trim arrangement in accordance with an embodiment of the invention.
Figure 2:
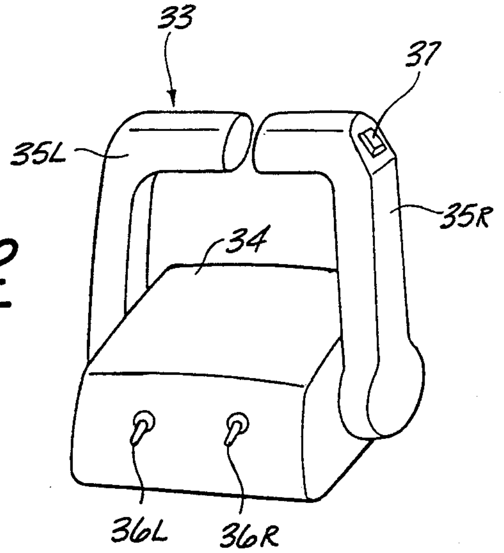
FIG. 2 is an enlarged perspective view of the control unit for the propulsion devices.
Figure 3:
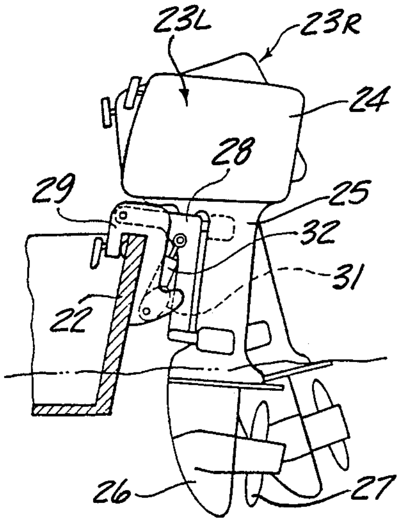
FIG. 3 is a side elevational view showing the propulsion devices.

A watercraft having dual propulsion with its tilt and trim controlled by a unit constructed in accordance with a first embodiment of the invention is identified generally by the reference numeral 21. The watercraft 21 has a transom 22 on which a pair of outboard motors 23L and 23R are mounted in a manner as best shown in FIG. 3. As shown in this figure, each outboard motor 23L and 23R is comprised of a power head 24 in which an internal combustion engine of a known type is supported. The engine within the power head 24 drives a drive shaft that extends through a drive shaft housing 25 and which terminates in a lower unit 26. The lower unit 26 incorporates a forward, neutral, reverse transmission (not shown) for selectively driving a propeller 27 in a forward or reverse direction.

The drive shaft housing 25 carries a steering shaft (not shown) which is journaled for steering movement about a generally vertically extending axis in a swivel bracket 28. The swivel bracket 28 is, in turn, pivotally connected about a horizontally disposed tilt axis to a clamping bracket 29 which is detachably connected to the transom 22 in a known manner. The static trim position of each outboard motor 23L and 23R is controlled by a manually positioned trim stop 31.

A hydraulic tilt and trim unit, indicated generally by the reference numeral 32, is interposed between the clamping bracket 29 and swivel bracket 28 of each of the outboard motors 23L and 23R. The hydraulic unit 32 includes an integral shock absorbing unit so as to permit each outboard motor 23L or 23R to pop up when an underwater obstacle is struck and return to the set trim adjusted position when this obstacle is cleared. In addition, the units 32 operate as fluid motors for accomplishing trim or tilt adjustment of the individual outboard motors 23L and 23R. For this purpose, a suitable electrically operated reversible hydraulic pump (not shown) is incorporated for selectively pressurizing the cylinders 32 so as to expand or retract them and accomplish this tilt and trim adjustment. The hydraulic mechanism and associated electrically operated pump may be of any known type and, for that reason, the details of these elements have not been shown.

Referring now again to the remaining figures, a control unit, indicated generally by the reference numeral 33 is positioned within the watercraft 21 in proximity to the operator. The control unit 33 includes a base assembly 34 on which a pair of control levers 35L and 35R are pivotally supported. The levers 35L and 35R are associated with the respective outboard motors 23L and 23R by means of a suitable remote control mechanism so as to control both the throttle and transmission of the respective motors in a known manner.

The base assembly 34 also mounts a pair of three-position normally open switches 36L and 36R each of which is adapted to control the electric motor associated with the respective hydraulic unit 32 for controlling the trim and tilt adjusted positions of the outboard motors 23L and 23R in a manner to be described. In addition, a master control switch 37 is supported on one of the control levers 35L and 35R (the lever 35R in the illustrated embodiment) for operating the electric motors and hydrualic cylinders 32 simultaneously in a manner to be described. The switch 37 is a two position normally open switch.

Referring now to FIG. 4, the circuit for controlling the tilt and trim positions of the outboard motors 23L and 23R is illustrated schematically. As has been noted, there is an electric motor associated with each of the hydraulic units 32 for controlling the tilt and trim position of the respective outboard motor 23L, 23R. The electric motor associated with the outboard motor 23L and specifically its hydraulic cylinder 32 is comprised of a down winding 38LD and an up winding 38LU. In a similar manner, the electric motor associated with the outboard motor 23R has a down winding 39RD and an up winding 39RU. When the up windings of the respective motors 38LU or 39RU are energized, the motors will be driven in a direction so as to pressurize the respective hydraulic cylinder 32 so as to raise the associated outboard motor 23L or 23R. Alternatively, when the motors are driven in the opposite directions by energizing their windings 38LD or 39RD, the hydraulic cylinders 32 will be pressurized so as to lower the respective outboard motors 23L or 23R.

The main switch 37 is in a series circuit with a battery 41 and the switches 36L and 36R are in parallel with this series circuit. The switches 36L and 36R, as has been noted, are of the three-position type and have a neutral position and respective up terminals 41LU and 42RU and down terminals 41LD and 42RD. The terminal switches 41LU and 42RU are in series circuit with the respective up windings 38LU and 39RU and the terminals 41LD and 41RD are in series circuit with the down windings 38LD and 39RD.

Adjustment of the tilt or trim positions of the outboard motors 23L or 23R in this embodiment is as follows. If it is desired to adjust the tilt and/or trim of either motor 23L or 23R independently of the other, the respective control switch 36L or 36R associated with that motor is switched to either the up condition by closing the switch to complete the circuit through the terminal 41LU or 42RU or the down condition by closing the switches to complete the circuit through the terminal 41LD or 42RD. Then, the main switch 37 is closed and a circuit will be completed through the respective up or down winding 38LU, 39RU or 39LD or 39RD and the respective electric motor will be driven in a direction so as to operate the associated hydraulic cylinder 32 so as to either raise or lower the respective outboard motor.

If it is desired to operate and trim or tilt the two motors 23L and 23R simultaneously, both of the switches 36L and 36R are operated so as to close the circuit through the respective terminals 41LU and 41RU or 41LD and 42RD. Then, when the master switch 37 is closed, both the windings 38LU and 39RU or 39LD and 39RD will be energized so as to drive both electric motors to accomplish the adjustment of both outboard motors 23L and 23R simultaneously.

It should be understood that the switches 36L and 36R and main control switch 37 are energized for the respective periods of time necessary to accomplish the desired adjustment. It full tilt up or full tilt down operation is desired, the switches 36L, 36R and 37 may be maintained in their closed position until a limit stop (not shown) is engaged which can disable the respective circuits, if desired.

Embodiment of FIGS. 5 And 6

The embodiments of FIGS. 1 through 4 has the advantage of being extremely simple and requiring a minimum of electrical components. However, as should be apparent, it is necessary for the operator to close several switches in order to accomplish tilt and trim adjustment. That is, under all circumstances, the operator must operate either or both the switches 36L and/or 36R as well as the main switch 37 so as to accomplish adjustment. In the embodiment of FIGS. 5 and 6, the operation is simplified, as will become apparent.

In this embodiment, the motor windings are the same as in the preceding embodiment and, for that reason, they have been identified by the same reference numerals.

In this embodiment, a master control 51 is provided which has individual levers 52R and 52L that are connected in a known manner to the associated outboard motors 23R and 23L for controlling their throttle and transmissions. In addition, a base 53 that journals the levers 52R and 52L carries individual switches 54R and 54L for controlling the tilt and trim of the respective outboard motors 23R and 23L. These switches 54R and 54L are each operative to independently control the tilt and trim of the respective motor independently of its position or the position of the other outboard motor and independently of a master control switch 55 that is carried by one of the levers 52L or 52R (in this case, the lever 52L). In this embodiment, each of the switches 54R, 54L and 55 are of the three position normally open type.

Referring now primarily to FIG. 6, it will be seen that the main switch 55 has a pair of switching contacts 55L and 55R, each of which is in respective parallel circuits with the individual control switches 54L and 54R between the battery or batteries 41 and the respective motor windings. The switches 54L and 54R have respective terminals 56LU and 57RU that are in circuit with the up windings 38LU and 39RU and terminals 56LD and 57LD that are in circuit with the motor down windings 38 LD and 39RD. Hence, operation of either switch 54R or 54L in the appropriate direction will accomplish either trim up or trim down adjustment of the respective outboard motor 23L or 23R.

As has been noted, in this embodiment, both of the outboard motors 23L and 23R may be tilted or trimmed up or down simultaneously by operation of the single main switch 55. As has also been noted, the main switch 55 has a pair of contacts 55L and 55R. The terminal 55L cooperates with either of a pair of terminals 58LU or 58LD each of which is in parallel with the terminals 56LU and 56LD, respectively, or 58RU and 58RD which are in parallel with the terminals 57LU and 57LD, respectively. Hence, if simultaneous trim or tilt up is desired, the switch 55 is manipulated so as to bring the contact 55L into contact with the terminal 58LU and the contact 55R into contact with the terminal 58RU so as to simultaneously energize the windings 38LU and 39RU so as to trim up both motors 23L and 23R simultaneously. Simultaneous trim down adjustment may be accomplished by bringing the contacts 55L and 55R into contact with the terminals 58LD and 58RD so as to simultaneously energize the windings 38LD and 39RD.

Figure 7:
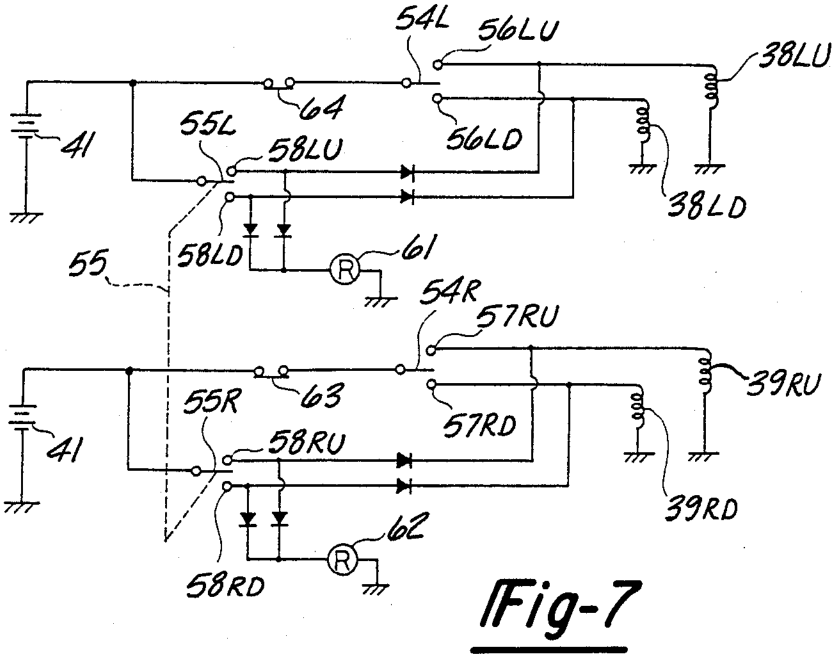
FIG. 7 is a schematic electrical circuit of another embodiment of the invention.

Embodiment Of FIG. 7

As has been noted, the embodiment of FIGS. 5 and 6 has the advantage over the embodiment of FIGS. 1 through 4 in that only a single switch need be operated to control either outboard motor independently of the others or both outboards motor simultaneously. However, there is a disadvantage with the embodiment of FIGS. 5 and 6 in that if both the individual switch associated with a given outboard motor and the main switch are operated simultaneously and in opposite senses, the electric motor associated with that outboard motor could be overloaded. The embodiment of FIG. 7 overcomes this disadvantage.

Certain of the components of the embodiment of FIG. 7 are the same as the embodiments of FIGS. 5 and 6 and where this is the case, those components have been identified by the same reference numerals. In this embodiment, there is a diode in the connection between each of the terminals 58LU and 58LD of the main switch 55 with the terminals 56LU and 56LD of the individual switch 54L. In a similar manner, diodes are positioned in the parallel connections between the terminals 58RU and 57RU and 58RD and 57RD. The terminals 58LU and 58LD are each in series circuit with a relay 61 by means of circuits that include diodes. In a similar manner, the terminals 58RU and 58RD are in series circuit with a second relay 62 by circuits that include diodes.

The relay 61 operates a switch 63 that is in the series circuit between the battery 41 and the switch 54L. The switch 63 is normally closed and is opened when the relay 61 is energized by the closure of the switch contacts 55L with either of the terminals 58LU or 58LD. In a similar manner, the relay 62 operates a normally closed switch 64 that is in a series connection between the battery 41 and the switch 54L for opening the connection at such times as the relay 62 is energized.

In this embodiment, the operation of the individual switches 54L and 54R and their cooperation with the respective outboard motors 23L and 23R is as in the previously described embodiments. Hence, this operation will not be repeated. The diode in the parallel circuits with the switch terminals 58LU, 58LD, 58RU and 58RD prevents energization of the relays 61 or 62 when only the switches 54L or 54R are energized.

In this embodiment, operation of the main switch 55 so as to cause its contacts 55L and 55R to make contact with either the terminals 58LU, 58RU, 58LD and 58RD will, in addition to energizing the respective windings 38LU, 39RU and/or 38LD and 39RD will in addition energize the relays 61 and 62. This will cause their respective contacts 63 and 64 to open and de-energize the switches 54L and 54R. Hence, closure of these switches will not complete any additional circuit to the opposite winding respective motor and overloading will be prevented.

Figure 8:
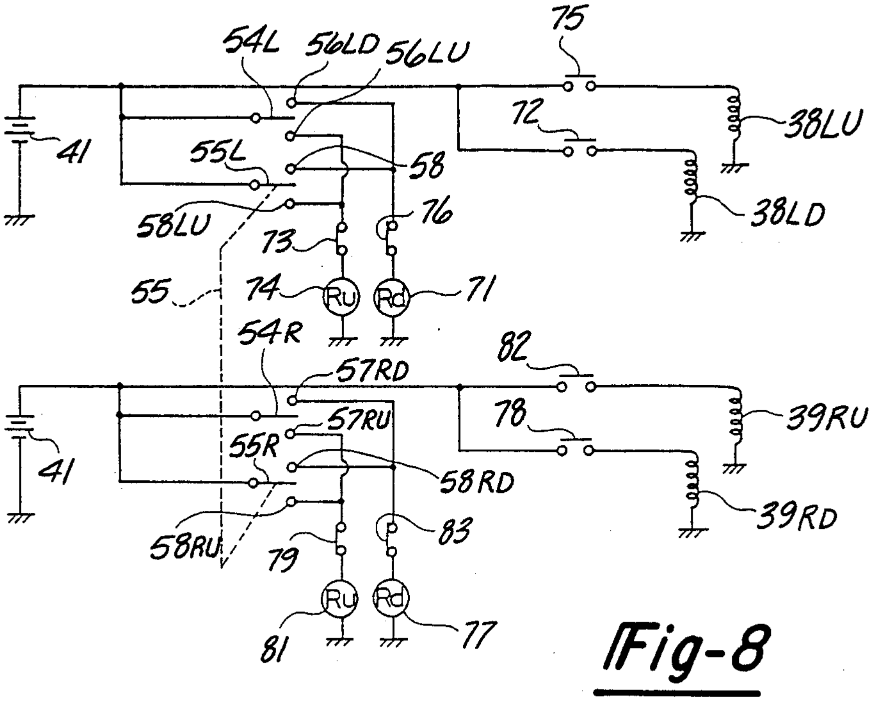
FIG. 8 is a schematic electrical circuit of a still further embodiment of the invention.

Embodiment of FIG. 8

This embodiment has the same advantages as the embodiments of FIGS. 5 and 6 and of FIG. 7 in that only a single switch need be operated to trim up or trim down either or both of the outboard motors 23L and 23R. This embodiment also has the advantage of the embodiment of FIG. 7 in that overloading of the individual motors as might be caused by operation of the main switch in one direction and one of the individual switches in the opposite direction is precluded. In addition, this embodiment has the further advantage in that none of the switches need carry the main current necessary to energize the individual motors.

In describing this embodiment, the individual switches and their terminals, the motor windings and the battery or batteries have all been identified by the same reference numerals as those applied in FIGS. 6 and 7. In this embodiment, the terminals 56LD and 58LD rather than being in parallel circuit with the winding 38LD of the motor are in parallel circuit with a first relay coil 71. The relay coil 71 operates a first normally opened contact or switch 72 in a circuit between the winding 38LD of the motor and the battery 41 and a second, normally closed switch 73 in the circuit between the terminals 56LU and 58LU and a second relay coil 74. The relay coil 74 is in parallel circuit with the terminals 56LU and 58LU rather than directly with the motor winding 38LU as with the embodiment of FIG. 7.

The second relay coil 74 operates a first normally opened switch 75 in a series connection between the battery 41 and the motor winding 38LU and a second normally closed switch 76 in the circuit between the terminals 56LD and 58LD and the solenoid coil winding 71.

A third relay coil 77 is in the parallel circuit between the switch terminals 57RD and 58RD in place of the motor winding 39RD of the embodiment of FIG. 7. The relay 77 operates a first normally opened switch 78 in a series circuit between the battery 41 and the motor winding 39RD. A second normally closed switch 79 of the relay 77 is disposed in a parallel circuit between the switch terminals 57RU and 58RU and a fourth relay coil 81. The relay coil 81 replaces the motor winding 39RU of the embodiment of FIG. 7 in this embodiment.

The fourth relay 81 operates a normally opened switch 82 in a series connection between the battery 41 and the motor winding 39RU and a second normally closed switch 83 in the parallel winding between the switch terminals 57RD and 58RD and the relay coil 77.

This embodiment works as follows. If it is desired to raise the left hand outboard motor 23L individually, the switch 54L is moved so as to bring its terminal into contact with the terminal 57LU. This completes the circuit between the battery 41 and the relay coil 74 since the switch 73 is, as has been noted, closed. When the relay coil 74 is energized, its normally opened switch 75 will be closed and the circuit between the battery 41 and the left hand motor winding 38LU will be closed and this motor will be energized so as to drive the pump associated with the cylinder 32 so as to raise the left outboard motor 23L. At the same time, the normally closed switch 76 will be opened and the line between the switch terminal 58LD and the relay 71 will be opened. Hence, movement of the switch 55 so as to energize the coils 71 will be disabled and the motor winding 38LD cannot be energized so as to overload the electric motor associated with the outboard motor 23L.

To lower the left outboard motor 23L, the individual switch 54L is moved to contact the terminal 56LD and energize the relay coil 71. This causes the switch 72 to close and energize the down motor winding 38LD. At the same time, the switch 73 is opened so that the relay coil 74 will be disabled in the event that the common switch 55 is operated inadvertently to prevent energization of the motor winding 38LU.

The right outboard motor 23R may be individually raised by operating the switch 54R so as to complete the circuit through either the relay coils 81 or 77 to respectively raise or lower this outboard motor in the manner which is believed to be apparent. As with the preceding embodiment, if the coil 77 is energized, the switch 78 will be closed and the down motor winding 39RD will be energized. At the same time, the switch 79 will be opened so as to disable the winding 81 and protect the electric motor. If the up relay 81 is energized, the switch 82 will be closed and the switch 83 opened as is believed to be apparent.

In this embodiment, if the common switch 55 is operated so as to simultaneously raise or lower the outboard motors 23R and 23L, the same operation of the relay coils will be accomplished and the same protection as had the individual switches 54L or 54R been operated.

Figure 9:
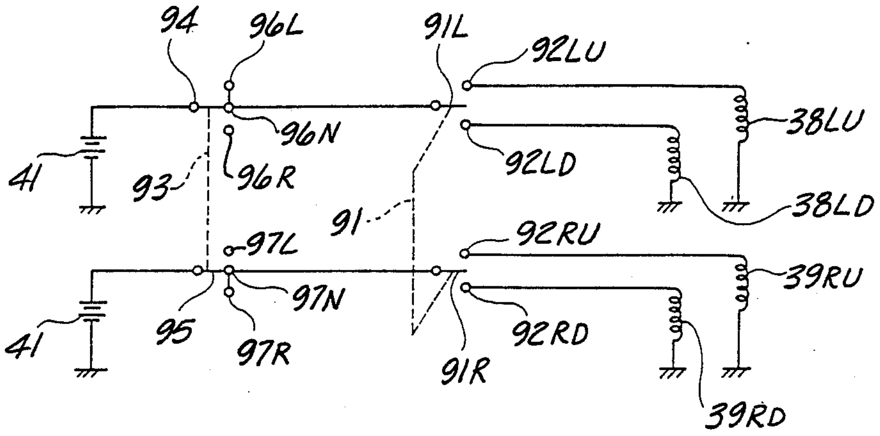
FIG. 9 is a schematic electrical circuit of a still further embodiment of the invention.

Embodiment Of FIG. 9

Each embodiment of the invention thus far described has employed three manually operated switches for accomplishing either individual or simultaneous adjustment of the trim or tilt conditions of the two outboard motors. FIG. 9 illustrates an embodiment wherein two switches are employed for this purpose. In this embodiment, the individual electric motor windings have been identified by the same reference numerals as employed in conjunction with the descriptions of the previous embodiments as is the case with the battery or batteries.

A first switch 91 has first and second contacts 91L and 91R for operating the right and left electric motors, respectively, associated with each outboard motor. The switch 91 is of the three position normally open type. Each contact 91L and 91R is adapted to engage a first terminal 92LU or 92RU which will complete a series circuit between the batery 41 and the respective up motor winding 38LU or 38RU. In the remaining position, each contact 91L engages a terminal 92LD or 92RD that completes a series electrical circuit between the battery 41 and the respective down motor winding 38LD and 39RD. Hence, the switch 91 may be considered as a directional switch to control either up or down.

A second three position switch 93 is provided which also has a pair of simultaneously operated contacts 94 and 95. The contact 94 is selectively engageable with a terminal 96L, a terminal 96N or a terminal 96R. In a like manner, the contact 95 is selectively engageable with a terminal 97L, a terminal 97N or 97R. It should be noted that the terminals 96L and 96N and the terminals 97N and 97R are wired together while the terminals 96R and 97L are open terminals. The switch 93 is selectively movable between a left condition, a common condition and a right condition. In the left condition, only the left hand outboard motor 23L will be adjusted, in the right condition, only the right hand outboard motor 23R will be adjusted and, in the common position, both outboard motors 23L and 23R may be adjusted.

If the operator decides to raise one or both of the outboard motors, he moves the switch 91 so that the contacts 91L and 91R will contact the terminals 92LU and 92RU simultaneously. The switch 93 is operated so as to determine if both motors will be operated simultaneously or only one of the motors will be operated. If the switch 93 is left in the position shown in FIG. 9, both motors will be raised simultaneously because the battery 41 will be in closed series contact with the up motor windings 38LU and 39RU. If, however, it is desired to raise the left outboard motor, the switch 93 is moved to the left condition so that the contact 94 engages 96L while the contact 95 engages the terminal 97L. Since 97L is opened, there will be no current flow through the winding 39RU and only the winding 38LU will be energized to drive the outboard motor 23L upwardly. In a like manner, if the operator wishes to raise only the right hand motor, the switch 93 is moved so that the contact 94 engages the open terminal 96R while the contact 95 engages the terminal 97R which completes the circuit through the motor winding 39R to raise the right hand motor 23R.

It should be noted that lowering movement of either or both motors is accomplished by moving the switch 91 so that the contacts 91L and 91R engage the terminals 92LD and 92RD. Also, the switches 91 and 93 may be operated in any sequence.

Figure 10:
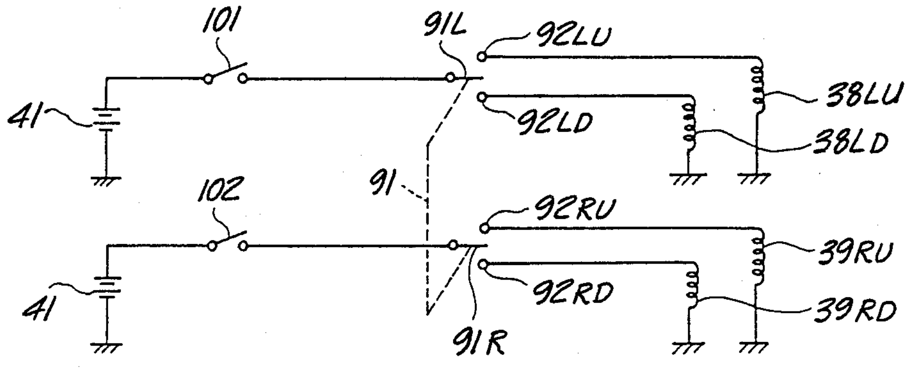
FIG. 10 is a schematic electrical circuit of yet another embodiment of the invention.

Embodiment Of FIG. 10

FIG. 10 illustrates an embodiment which is similar to FIG. 4 in that it employs a relatively simple electrical circuit that incorporates a minimum number of components. The embodiment is also similar to the embodiment of FIG. 9 in that a single directional control switch is employed for controlling either the up or down movement of the outboard motors while a separate selector switch arrangement is employed for determining which or the motors are actuated.

Referring now to the drawing of this figure, the battery and electric motor windings are identified by the same reference numerals as were used in conjunction with the embodiment of FIG. 9. In addition, the selector switch, which is the same as the embodiment of FIG. 9, is also identified by the same reference numeral as are its contacts and terminals.

In the embodiment of FIG. 9, a single three position dual contact switch was employed in the circuit between the battery 41 and the directional selector switch 91. In this embodiment, a first control switch 101 is positioned in series circuit between the battery 41 and the contact 91L of the switch 91 and a single switch 102 is positioned in the series circuit between the battery 41 and the contact 91R of the directional control switch 91. Thus, the operator's positioning of the switch 91 will determine if the outboard motor or outboard motors are raised or lowered. If the contacts 91L and 91R engage the terminals 92LU and 92RU, the motors will be raised while if they contact the terminals 92LD and 92RD, the motors will be lowered. The positioning of the switches 101 and 102 determines if one or both of the motors are raised or lowered. In order to achieve simultaneous operation, both switches 101 and 102 are closed before the switch 91 is moved from its neutral position to either of its raise or lower positions. If, on the other hand, it is desired to raise or lower only one of the outboard motors, the sequence of operation of the switches 101, 102 and 91 is not significant.

Figure 11:
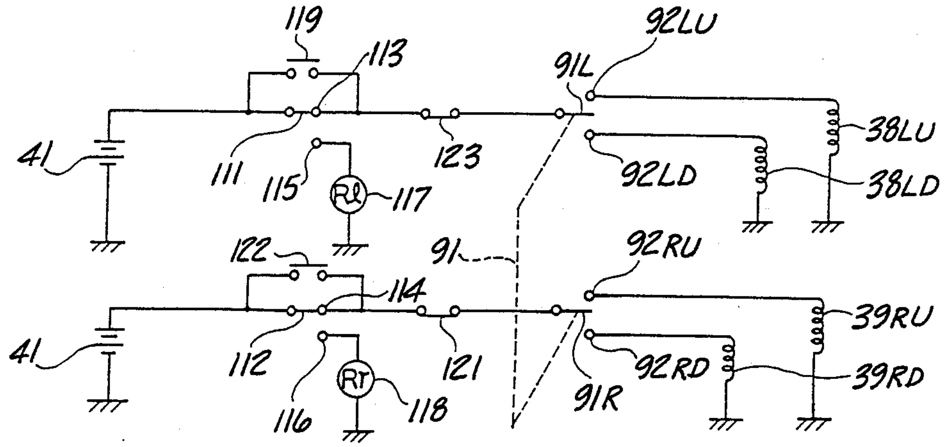
FIG. 11 is a schematic electrical circuit of yet another embodiment of the invention.

Embodiment Of FIG. 11

FIG. 11 illustrates a further embodiment of the invention which is generally similar to that of FIG. 10. However, in this embodiment, it is not necessary to operate all three switches in order to simultaneously raise or lower the outboard motors. The directional selector switch, electric motor windings and battery are all the same as the embodiment of FIG. 10 and these components have been identified by the same reference numerals.

The selection of the outboard motor or motors which are adjusted is controlled by a left selector switch 111 and a right selector switch 112. Each switch is normally biased so that its conductor engages a first terminal 113 and 114 that completes a series circuit between the battery 41 and the respective directional selector switch conductor 91L and 91R. In addition, each switch has a respective terminal 115 and 116 that is in circuit with a relay coil 117 and 118, respectively. The relay coil 117 operates a pair of switches comprised of a first switch 119 which is normally open and which when closed forms a parallel or shunting circuit across the switch 111 and a second switch 121 that is in a series circuit between the switch 112 and the directional selector switch contact 91R. In a like manner, the relay 118 operates a pair of switches comprised of a first normally opened switch 122 that forms a shunting circuit around the switch 112 and a second normally closed switch 123 that is in series with the switch 111 and the conductor 91L of the directional selector switch 91.

This embodiment operates as follows. When the device is in its normal condition as shown in FIG. 11, the switches 111 and 112 are normally closed and thus power is available at the conductors 91L and 91R of the director selector switch 91. Thus, if the operator determines to simultaneously select trim up or trim down conditions, he need only move the directional selector switch 91 in the appropriate direction so as to complete the circuits through either the up windings 38LU and 39RU or the down windings 38LD and 39RD.

If, however, the operator wishes to operate only one of the outboard motors, for example, the left outboard motor, he moves the motor selector switch 111 so as to bring its conductor into engagement with the terminal 115. This energizes the relay 117 and will effect closure of the normally opened switch 119 so as to shunt the now opened switch 111 and open the normally closed switch 121 so as to open the circuit to the conductor 91R of the direction selector switch 91. Hence, only the conductor 91L of the directional selector switch 91 is energized and only this contact will be effective to cause trim up or trim down depending upon which direction the operator moves the direction selector switch 91.

If the operator determines that he wishes to effect trim up or trim down of only the right hand outboard motor, he need only close the switch 112 to bring its conductor into contact with the terminal 116 which will energize the relay 118 and close its switch 122 and open the switch 123.

Figure 12:
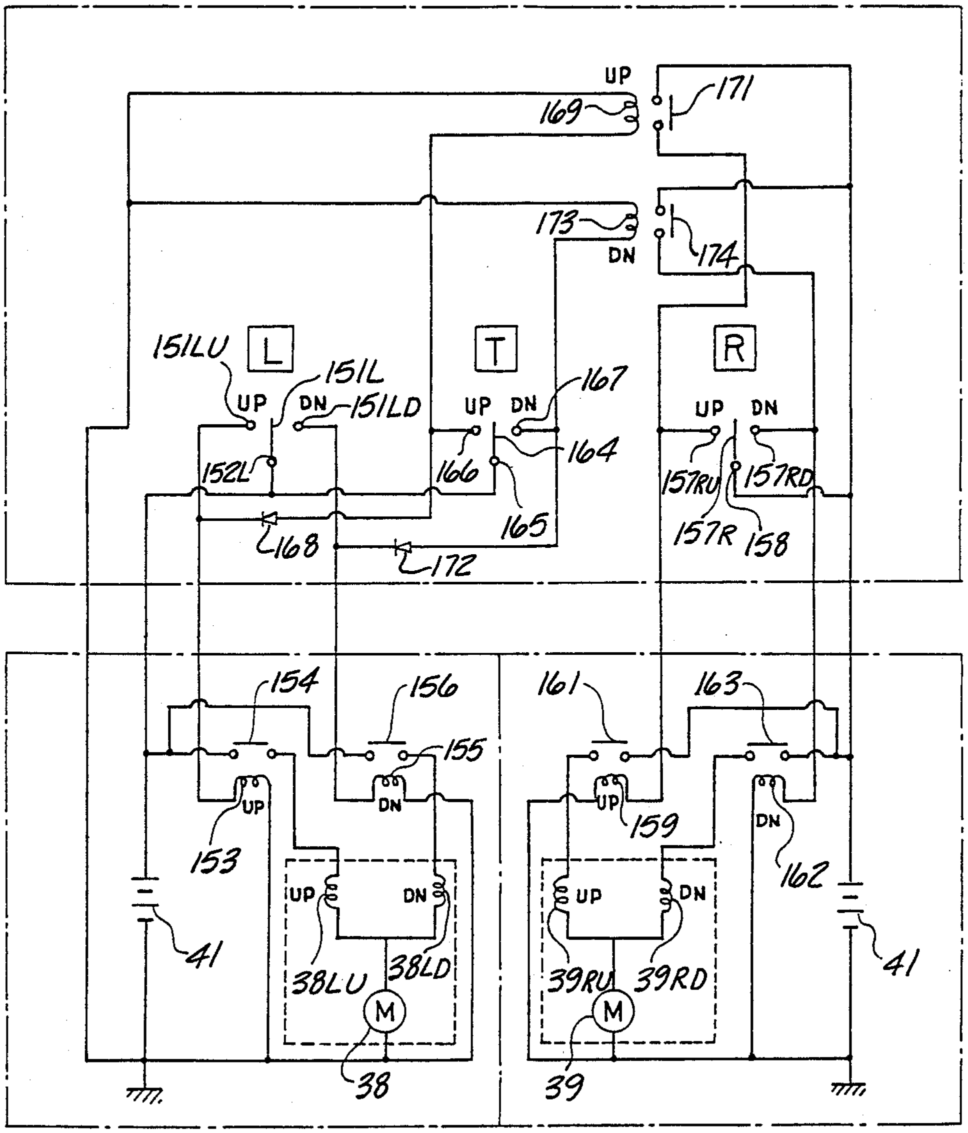
FIG. 12 is a schematic electrical circuit of a still further embodiment of the invention.

Embodiment Of FIG. 12

The embodiment of FIG. 12 is generally similar to the embodiments of FIGS. 6 and 8. In this embodiment, however, each switch controls a respective relay and thus it is possible to use smaller switches than with certain of the previously described embodiments. In this embodiment, the actual motors for controlling the individual outboard motors are illustrates and are identified by the reference numerals 38 and 39, respectively. In addition, their respective raising and lowering windings are identified by the same reference characters as utilized in the embodiment of FIG. 8 as is the battery or batteries.

In this embodiment, the left motor control L includes a conductor 151L that is in circuit with a common connector 152L. The conductor 151L is normally opened but is selectively engageable with an up terminal 151LU and a down terminal 151LD. The up terminal 151LU is in circuit with a relay coil 153 that actuates a normally open switch 154 so as to complete a circuit through the up motor winding 38LU when the conductor 151L is brought into contact with the terminal 151LU. The down terminal 151LD is in circuit with a further relay coil 155 that operates a normally opened switch 156 to complete the communication through the down motor winding 38LD when the contact 151L is moved to the down position.

In a similar manner, a right motor control switch R has a conductor 157R that is supplied from the battery 41 through a common terminal 158 and which is engageable with either an up terminal 157 RU or a down terminal 157RD. The up terminal 157RU is in circuit with a relay coil 159 that operates a normally open switch 161 so as to energize the up motor winding 39RU when the conductor 157R is brought into contact with the terminal 157RU. The down terminal 157 is in circuit with a relay coil 162 that operates a normally open switch 163 which is in series circuit between the battery 41 and the down motor winding 39RD so as to energize this circuit when the conductor 157R is brought into contact with the terminal 157RD.

A common control switch T is provided with a conductor 164 that is fed from the battery 41 via a common terminal 165. The conductor 164 is normally open but is selectively engageable with either an up terminal 166 or a down terminal 167 for operating each of the motors 38 and 39 in their up or down modes simultaneously. For this purpose, the up terminal 166 is in circuit with the relay coil 153 through a series circuit that includes a diode 168 so that closure of the switch from the conductor 164 to the terminal 166 will energize the relay coil 153, close its switch 154 and energize the up motor winding 38LU. A further relay coil 169 is in parallel circuit with the diode 168 and relay coil 153 across the battery 41. The relay coil 169 has a normally opened switch 171 which closes when the relay coil 169 is energized due to movement of the conductor 164 of the switch T into engagement with the terminal 166. The switch 171 is in parallel with the battery 41 and relay coil 159 so that its closure will energize the relay coil 159, close its switch 161 and energize the up motor winding 39RU.

In a similar manner, the down terminal 167 of the switch T is in circuit with the relay coil 155 through a diode 172. Hence, when the conductor 164 engages the terminal 167, the coil 155 will be energized, the switch 156 closed and the motor winding 38LD energized. At the same time, a parallel coil winding 173 will be energized so as to close its normally opened switch 174 and energize the down relay coil 162 to close its switch 163 and energize the down motor winding 39RD.

Figure 13:
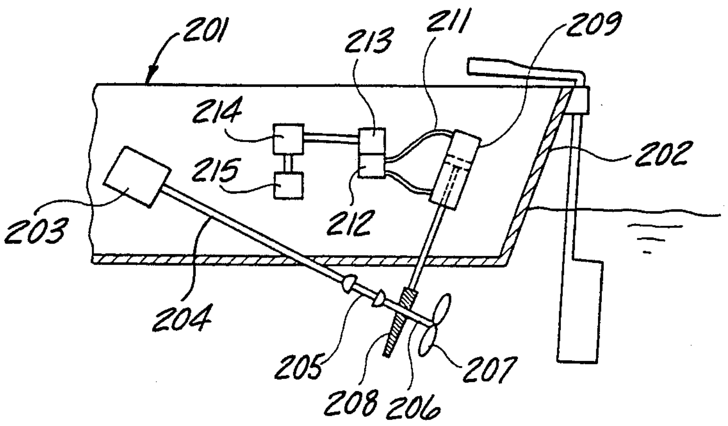
FIG. 13 is a partial side elevational view showing how the invention can be employed in conjunction with an inboard drive arrangement.

Embodiment Of FIG. 13

In each of the embodiments described, an arrangement has been provided for adjusting the trim or tilt position of either or both of a pair of outboard motors. It should be readily apparent to those skilled in the art that the mechanisms disclosed can be equally well employed in adjusting the tilt and trim condition of the outboard drive portion of an inboard/outboard drive. In addition, the control apparatus disclosed also can be utilized for adjusting the trim angle of an inboard drive and such an embodiment is shown in FIG. 13. In this embodiment, only the mechanical arrangement associated with one of a pair of twin screws is illustrated and the control mechanism is not illustrated in any detail nor will it be described in detail. It should be apparent to those skilled in the art that any of the control mechanisms of the previously described embodiments can be utilized in connection with this embodiment.

A watercraft hull powered in accordance with this embodiment is identified generally by the reference numeral 201 and includes a transom 202. One or more inboard engines 203 are mounted within the hull 202 and drive a pair of parallel drive shafts 204 (only one of which appears in the drawings). The drive shafts 204 extend through the lower portion of the hull of the watercraft 201 and are appropriately sealed where they pass through the hull. Beneath the hull, each drive shaft 204 ends in a universal joint 205 which connects the drive shaft 204 to a propeller shaft 206. A propeller 207 is affixed to each propeller shaft 206 for driving the watercraft 201 in a known manner.

The propeller shaft 206 is carried by a skeg 208 that is supported for reciprocation and which is operated by means of a fluid motor 209. Actuation of the fluid motor 209 will raise or lower the skeg 208 and change the angular position of the propeller shaft 206 about the universal joint 205 so as to adjust the trim angle of the propeller 207. It is to be understood that there is a separate fluid motor 209 associated with each of the propeller shafts 206.

A pair of hydraulic lines 211 extend to the opposite sides of the fluid motor 209 for operating its internal piston. A hydraulic pump of the reversible type 212 supplies pressures to one of the lines while the other line serves as a return line, depending upon whether it is desired to raise or lower the propeller 207. A reversible electric motor 213 drives the fluid pump 212 and is controlled by means of a control circuit 214 and electric battery 215. As has been noted, the control circuit 214 may be of any of the type disclosed in conjunction with the previously described embodiments.

It should be readily apparent from the foregoing description that a number of embodiments of the invention have been illustrated and described, each of which permits adjustment of the trim of individual driving propellers of a watercraft or which permits both propellers to be adjusted simultaneously under the operator's control. Although a number of embodiments have been illustrated and described, various changes and modifications may be made without departing from the spirit and scope of the invention, as defined by appended claims.

We claim:

1. In a marine drive for controlling a pair of propulsion means each adapted to be mounted relative to an associated watercraft for movement in a trim adjusting direction, first and second drive means each associated with a respective one of said propulsion means for moving the respective propulsion means relative to the associated watercraft in a trim adjusting position, first control means for selectively operating said frist drive means for adjusting the trim of the first of said propulsion means regardless of the trim adjusted position thereof, second control means for selectively operating said second drive means for adjusting the trim of the second of said propulsion means regardless of the trim adjusted position thereof, and third control means for simultaneously operating said first and second drive means simultaneously in either trim direction to adjust the trim position of each of said propulsion means in either selected direction and independently of the trim adjusted position of either of said propulsion means.

2. In a marine drive as set forth in claim 1 wherein the propulsion means each comprises a marine outboard drive supported for steering movement about a generally vertically extending axis and for tilt and trim movement about a generally horizontally extending axis.

3. In a marine drive as set forth in claim 2 wherein the drive means includes a reversible electric motor.

4. In a marine drive as set forth in claim 3 wherein the reversible electric motor drives a reversible fluid pump and the respective outboard drives are operated by a fluid motor controlled by the respective reversible fluid pump.

5. In a marine drive as set forth in claim 1 wherein the propulsion means comprise a pair of propellers each driven by a propeller shaft that extends through the hull of the associated watercraft.

6. In a marine drive as set forth in claim 5 wherein the drive means includes a reversible electric motor.

7. In a marine drive as set forth in claim 6 wherein the reversible electric motor drives a reversible fluid pump and the respective propellers are operated by a fluid motor controlled by the respective reversible fluid pump.

8. In a marine drive as set forth in claim 1 wherein the drive means includes a reversible electric motor.

9. In a marine drive as set forth in claim 8 wherein the first control means selectively controls the direction of rotation of the first of the electric motors, the second control means selectively controls the direction of rotation of the second of the electric motors, and the third control means selectively controls the direction of rotation of both of said electric motors.

10. In a marine drive as set forth in claim 9 wherein the third control means is in series circuit with the first and second control means for selectively controlling the energization of the first and second control means.

11. In a marine drive as set forth in claim 1 wherein the drive means comprise first and second reversible fluid pumps.

12. In a marine drive as set forth in claim 11 wherein the first control means selectively controls the direction of rotation of the first of the fluid pumps, the second control means selectively controls the direction of rotation of the second of the fluid pumps, and the third control means selectively controls the direction of rotation of each of the fluid pumps.

13. In a marine drive as set forth in claim 12 wherein the third control means operates in series with the first and second control means for selectively controlling the operation of the first and second control means.

14. In a marine drive as set forth in claim 11 wherein the first control means selectively controls the direction of rotation of the first of the fluid pumps, the second control means selectively controls the direction of rotation of the second of the fluid pumps, and the third control means selectively controls the first and second control means.

15. In a marine drive as set forth in claim 1 wherein the first control means selectively controls the direction of rotation of the first of the fluid pumps, the second control means selectively controls the direction of rotation of the second of the fluid pumps, and the third control means selectively controls the supply of power to the first and second control means.

16. In a marine drive for controlling a pair of propulsion means each adapted to be mounted relative to an associated watercraft for movement in a trim adjusting direction, first and second drive means including a first reversible electric motor and a second reversible electric motor each associated with a respective one of said propulsion means for moving the respective propulsion means relative to the associated watercraft in a trim adjusting position, first control means for selectively operating said first electric motor for adjusting the trim of the first of said propulsion means regardless of the trim adjusted position thereof, second control means for selectively operating said second electric motor for adjusting the trim of the second of said propulsion means regardless of the trim adjusted position thereof, and third control means for simultaneously operating said first and second electric motors simultaneously in either trim direction to adjust the trim position of each of said propulsion means in either selected direction and independently of the trim adjusted position of either of said propulsion means, said third control means being in parallel circuit with said first and second control means whereby said third control means controls said first and second electric motors independently of the first and second control means.

17. In a marine drive as set forth in claim 16 wherein the third control means comprises a switch having a pair of selectively operable contacts each in respective parallel circuit with a respective one of the first and second control means.

18. In a marine drive as set forth in claim 17 further including means operated by the third control means for disabling the first and second control means upon control of the electric motors by the third control means for precluding their control by the first and second control means.

19. In a marine drive as set forth in claim 18 wherein the disabling means comprises relays in the circuits of the third control means.

20. In a marine drive as set forth in claim 19 wherein the relays comprise first and second relays each in circuit with the respective of the contacts of the third control means for opening a switch in the series circuit between the power source and the respective other of the first and second control means.

21. In a marine drive as set forth in claim 19 wherein the relays comprise relays in circuit with each of the first and second control means for disabling the circuit of the other of the first or second control means to the same controlled electric motor.

22. In a marine drive for controlling a pair of propulsion means each adapted to be mounted relative to an associated watercraft for movement in a trim adjusting direction, first and second drive means each associated with a respective one of said propulsion means for moving the respective propulsion means relative to the associated watercraft in a trim adjusting position, said first and said second drive means each comprising a respective reversible fluid pump first control means for selectively controlling the direction of rotation of said first fluid pump for adjusting the trim of the first of said propulsion means regardless of the trim adjusted position thereof, second control means for selectively controlling the direction of rotation of said second fluid pump for adjusting the trim of the second of said propulsion means regardless of the trim adjusted position thereof, and third control means for simultaneously operating said first and second fluid pumps simultaneously in either trim direction to adjust the trim position of each of said propulsion means in either selected direction and independently of the trim adjusted position of either of said propulsion means, said third control means operating in parallel with said first and second control means whereby said third control means controls said first and second fluid motors independently of said first and second control means.

23. In a marine drive as set forth in claim 22 further including means operated by the third control means for disabling the first and second control means up on control of the fluid pumps by the third control means for precluding their control by the first and second control means.

24. In a marine drive for controlling a pair of propulsion means each adapted to be mounted relative to an associated watercraft for movement in a trim adjusting direction, means including first and second reversible electric motors associated with a respective one of said propulsion means for moving the respective propulsion means relative to the associated watercraft in a trim adjusting position, a source of electrical power, a first normally opened three position switch for controlling the communication of said electrical power source with said first electrical motor, a second, normally opened three position switch for controlling the communication of said electrical power source with said second electric motor, and a third normally opened two position switch in series circuit between said electrical power source and said first and said second switches.

25. In a marine drive as set forth in claim 24 wherein the propulsion means each comprises a marine outboard drive supported for steering movement about a generally vertically extending axis and for tilt and trim movement about a generally horizontally extending axis.

26. In a marine drive as set forth in claim 24 wherein the propulsion means comprise a pair of propellers each driven by a propeller shaft that extends through the hull of the associated watercraft.

27. In a marine drive for controlling a pair of propulsion means each adapted to be mounted relative to an associated watercraft for movement in a trim adjusting direction, means including first and second reversible electric motors associated with a respective one of said propulsion means for moving the respective propulsion means relative to the associated watercraft in a trim adjusting position, a source of electrical power, a first normally opened three position switch in series circuit between said electrical power source and said first electric motor, a second normally opened three position switch in series circuit between said electrical power source and said second electric motor, and a third, normally opened two contact switch having each of its contacts in parallel circuit with a respective one of said first and second switch between said electrical power source and the respective electric motor.

28. In a marine drive as set forth as claim 27 wherein the propulsion means each comprises a marine outboard drive supported for steering movement about a generally vertically extending axis and for tilt and trim movement about a generally horizontally extending axis.

29. In a marine drive as set forth in claim 27 wherein the propulsion means comprise a pair of propellers each driven by a propeller shaft that extends through the hull of the associated watercraft.

30. In a marine drive as set forth in claim 27 further including relay means in the circuit between the third electrical switch contacts and the respective electric motors for opening a normally closed switch between the source of electrical power and the respective first and second switches upon closure of said third switch contact.

31. In a marine drive as set forth in claim 30 wherein the propulsion means each comprises a marine outboard drive supported for steering movement about a generally vertically extending axis and for tilt and trim movement about a generally horizontally extending axis.

32. In a marine drive as set forth in claim 30 wherein the propulsion means comprise a pair of propellers each driven by a propeller shaft that extends through the hull of the associated watercraft.

33. In a marine drive as set forth in claim 27 wherein the first switch and the first contact of the third switch selectively operate relays for controlling the first electric motor and the second switch and the second contact of the third switch selectively operate relays for controlling the second electric motors.

34. In a marine drive as set forth in claim 33 wherein the relays include up relays and down relays each associated with a respective one of the electric motors, each relay being operative to open a normally closed switch in a circuit to the other relay of the respective electric motor when one of said relays is energized.

35. In a marine drive as set forth in claim 34 wherein the propulsion means each comprises a marine outboard drive supported for steering movement about a generally vertically extending axis and for tilt and trim movement about a generally horizontally extending axis.

36. In a marine drive as set forth in claim 34 wherein the propulsion means comprise a pair of propellers each drive by a propeller shaft that extends through the hull of the associated watercraft.

37. In a marine drive for controlling a pair of propulsion means each adapted to be mounted relative to an associated watercraft for movement in a trim adjusting direction, means including first and second reversible electric motors associated with a respective one of said propulsion means for moving the respective propulsion means relative to the associated watercraft in a trim adjusting position, a source of electrical power, a pair of normally opened three position switches for selectively operating said electric motors in a forward or reverse direction in parallel connection between said electrical power source and said motors, said first pair of switches being simultaneously operable between a neutral, forward and reverse position, a second pair of three positional switches in series circuit between said electrical power source and respective ones of said first pair of switches, said second pair of switches being commonly operated between a first position in which both of said first pair of switches is in circuit with said source of electrical power and first and second positions wherein only one of a respective one of said first switches is in communication with said electrical power source.

38. In a marine drive as set forth in claim 37 wherein the propulsion means each comprise a marine outboard drive supported for steering movement about a generally vertically extending axis and for tilt and trim movement about a generally horizontally extending axis.

39. In a marine drive as set forth in claim 37 wherein the propulsion means comprise a pair of propellers each driven by a propeller shaft that extends through the hull of the associated watercraft.

40. In a marine drive for controlling a pair of propulsion means each adapted to be mounted relative to an associated watercraft for movement in a trim adjusting direction, means including first and second reversible electric motors associated with a respective one of said propulsion means for moving the respective propulsion means relative to the associated watercraft in a trim adjusting position, a source of electrical power, a pair of normally opened three position switches for selectively operating said electric motors in a forward or reverse direction in parallel connection between said electrical power source and said motors, said first pair of switches being simultaneously operable between a neutral, forward and reverse position, a third switch in series circuit between said electrical power source and one of said first pair of switches, and a fourth switch in series circuit with said electric power source and the other of said first pair of switches.

41. In a marine drive as set forth in claim 40 wherein the third and fourth switches are normally closed switches in series circuit with the power source and a respective one of the first pair of switches and are movable to an opened position for creating a circuit through a relay coil which activates a shunting switch for closing the circuit between the source and the one of the first pair of switches.

42. In a marine drive as set forth in claim 41 wherein the relay coil further activates a normally closed switch in the series circuit between the source and the other of the first pair of switches of opening said switch when said relay coil is energized.

43. In a marine drive as set forth in claim 42 wherein the propulsion means each comprises a marine outboard drive supported for steering movement about a generally vertically extending axis and for tilt and trim movement about a generally horizontally extending axis.

44. In a marine drive as set forth in claim 42 wherein the propulsion means comprise a pair of propellers each driven by a propeller shaft that extends through the hull of the associated watercraft.

45. In a marine drive for controlling a pair of propulsion means each adapted to be mounted relative to an associated watercraft for movement in a trim adjusting direction, first and second drive means each associated with a respective one of said propulsion means for moving the respective propulsion means relative to the associated watercraft in a trim adjusting position, first control means for selectively operating said first drive means for adjusting the trim of the first of said propulsion means regardless of the trim adjusted postion thereof, second control means for selectively operating said second drive means for adjusting the trim of the second of said propulsion means regardless of the trim adjusted position thereof, and third control means in parallel circuit with said first and second control means for simultaneously operating said first and second drive means simultaneously in either trim direction to adjust the trim position of each of said propulsion means in either selected direction and independently of the trim adjusted position of either of said propulsion means and independently of said first and second control means.

46. In a marine drive as set forth in claim 45 wherein the propulsion means each comprises a marine outboard drive supported for steering movement about a generally vertically extending axis and for tilt and trim movement about a generally horizontally extending axis.

47. In a marine drive as set forth in claim 45 wherein the drive means includes a reversible electric motor.

48. In a marine drive as set forth in claim 47 wherein the reversible electric motor drives a reversible fluid pump and the respective outboard drives are operated by a fluid motor controlled by the respective reversible fluid pump.

49. In a marine drive as set forth in claim 45 wherein the propulsion means comprise a pair of propellers each driven by a propeller shaft that extends through the hull of the associated watercraft.

50. In a marine drive as set forth in claim 49 wherein the drive means includes a reversible electric motor.

51. In a marine drive as set forth in claim 50 wherein the reversible electric motor drives a reversible fluid pump and the respective propellers are operated by a fluid motor controlled by the respective reversible fluid pump.

52. In a marine drive as set forth in claim 51 wherein the first control means selectively controls the direction of rotation of the first of the electric motors, the second control means selectively controls the direction of rotation of the second of the electric motors, and the third control means selectively controls the direction of rotation of both of said electric motors.

* * * * *